(12) United States Patent
Huang et al.

(10) Patent No.: US 8,876,481 B2
(45) Date of Patent: Nov. 4, 2014

(54) TURBINE AIRFOIL COMPONENT ASSEMBLY FOR USE IN A GAS TURBINE ENGINE AND METHODS FOR FABRICATING SAME

(75) Inventors: Shyh-Chin Huang, Latham, NY (US); Frederic Joseph Klug, Schenectady, NY (US); Robert John Zabala, Schenectady, NY (US); Andrea Jeanne Howard, Ballston Spa, NY (US); Toby George Darkins, Jr., Loveland, OH (US)

(73) Assignee: General Electric Company, Schenectady,, NY (US)

( * ) Notice: Subject to any disclaimer, the term of this patent is extended or adjusted under 35 U.S.C. 154(b) by 817 days.

(21) Appl. No.: 12/984,836

(22) Filed: Jan. 5, 2011

(65) Prior Publication Data

US 2012/0171039 A1    Jul. 5, 2012

(51) Int. Cl.
*F01D 5/30* (2006.01)
*F01D 5/28* (2006.01)

(52) U.S. Cl.
CPC ............. *F01D 5/3007* (2013.01); *Y02T 50/672* (2013.01); *F01D 5/282* (2013.01); *F05D 2300/6033* (2013.01); *F01D 5/3092* (2013.01); *F01D 5/288* (2013.01); *F01D 5/30* (2013.01)
USPC ................ 416/219 R; 416/241 B; 29/889.71; 29/458

(58) Field of Classification Search
USPC ............. 416/204 R, 215, 217, 219 R, 220 R, 416/241 R, 241 B; 29/889.7, 889.71, 458
See application file for complete search history.

(56) References Cited

U.S. PATENT DOCUMENTS

| 3,824,113 | A | * | 7/1974 | Loxley et al. | 427/431 |
| 4,094,615 | A | * | 6/1978 | Glenn | 416/215 |
| 5,743,713 | A | * | 4/1998 | Hattori et al. | 416/215 |
| 6,444,332 | B1 | * | 9/2002 | Bettridge | 428/630 |
| 6,517,960 | B1 | * | 2/2003 | Wang | 428/701 |
| 7,093,359 | B2 | | 8/2006 | Morrison et al. | |
| 7,115,327 | B2 | * | 10/2006 | Spitsberg et al. | 428/697 |
| 7,351,364 | B2 | | 4/2008 | Morrison et al. | |
| 7,442,444 | B2 | * | 10/2008 | Hazel et al. | 428/641 |
| 7,740,960 | B1 | * | 6/2010 | Zhu et al. | 428/699 |
| 7,951,459 | B2 | * | 5/2011 | Tang et al. | 428/450 |
| 2005/0074625 | A1 | * | 4/2005 | Meschter et al. | 428/620 |
| 2008/0145674 | A1 | * | 6/2008 | Darolia et al. | 428/433 |
| 2008/0304959 | A1 | * | 12/2008 | Benoit et al. | 415/200 |
| 2009/0260364 | A1 | | 10/2009 | Keller et al. | |
| 2010/0021643 | A1 | | 1/2010 | Lane et al. | |
| 2010/0184816 | A1 | * | 7/2010 | Hauser-Hahn | 514/383 |

* cited by examiner

*Primary Examiner* — Edward Look
*Assistant Examiner* — Danielle M Christensen
(74) *Attorney, Agent, or Firm* — Armstrong Teasdale LLP

(57) ABSTRACT

A turbine airfoil component assembly for use with a turbine engine including a attachment assembly having an inner surface defining a cavity. The attachment assembly includes a metal alloy substrate. An airfoil assembly is at least partially positioned within the attachment assembly and extends outwardly from the attachment assembly. The airfoil assembly includes a ceramic matrix composite (CMC) substrate. A reaction barrier coating is disposed over at least a portion of the airfoil assembly. The reaction barrier coating is positioned between the attachment assembly and the airfoil assembly.

20 Claims, 6 Drawing Sheets

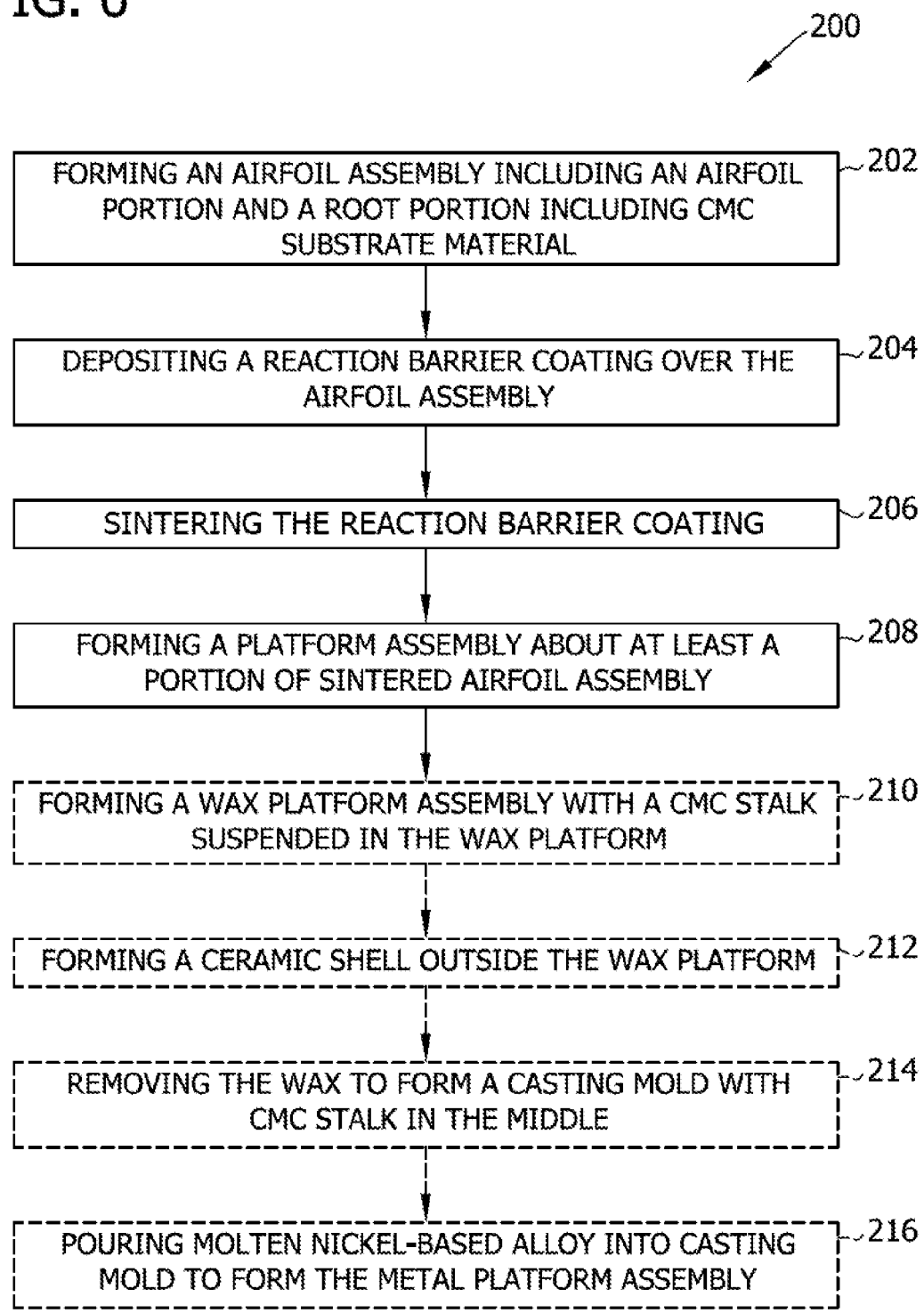

TURBINE AIRFOIL COMPONENT ASSEMBLY FOR USE IN A GAS TURBINE ENGINE AND METHODS FOR FABRICATING SAME

BACKGROUND OF THE INVENTION

The subject matter described herein relates generally to gas turbine engines and, more particularly, to a bucket assembly for use with a turbine engine.

At least some known gas turbine engines include a combustor, a compressor coupled downstream from the combustor, a turbine, and a rotor assembly rotatably coupled between the compressor and the turbine. At least some known rotor assemblies include a plurality of nozzle vanes, a rotor shaft, at least one rotor disk coupled to the rotor shaft, and a plurality of circumferentially-spaced turbine buckets that are coupled to each rotor disk. Each turbine bucket includes an airfoil that extends radially outward from a platform towards a turbine casing.

During operation of at least some known turbines, the compressor compresses air, that is mixed with fuel and channeled to the combustor. The mixture is then ignited generating hot combustion gases that are then channeled to the turbine. The nozzle vanes direct high-temperature fluids, such as combustion gases towards the turbine blades. The rotating turbine blades or buckets channel combustion gases through the turbine. The turbine extracts energy from the combustion gases for powering the compressor, producing useful work to power a load, such as an electrical generator, or to propel an aircraft in flight.

Furthermore, the airfoil portions of at least some known rotor blades are generally exposed to higher temperatures than the dovetail portions. Higher temperatures may cause steep thermal gradients to develop at the interface between the airfoil and the platform, and/or between the shank and the platform. These temperature gradients may cause compressive thermal stresses to be induced to the rotor blade platform. Over time, continued operation in high temperature and high stress conditions may cause platform oxidation, platform cracking, and/or platform creep deflection, any or all of which may shorten the useful life of the rotor assembly.

BRIEF SUMMARY OF THE INVENTION

In one aspect, a turbine airfoil component assembly for use with a turbine engine is provided. The turbine bucket includes an attachment assembly that has an inner surface that defines a cavity. The attachment assembly includes a metal alloy substrate. An airfoil assembly is at least partially positioned within the attachment assembly and extends outwardly from the attachment assembly. The airfoil assembly includes a ceramic matrix composite (CMC) substrate. A reaction barrier coating is disposed over at least a portion of the airfoil assembly. The reaction barrier coating is positioned between the attachment assembly and the airfoil assembly.

In a further aspect, a turbine engine system is provided. The turbine engine system includes a compressor, a turbine that is coupled in flow communication with the compressor to receive at least some of the air discharged by the compressor, and a rotor shaft that is rotatably coupled to the turbine. A plurality of circumferentially-spaced turbine blade assemblies are coupled to the rotor shaft. Each turbine blade assembly of the plurality of turbine blade assemblies includes an attachment assembly that has an inner surface that defines a cavity. The attachment assembly includes a metal alloy substrate. An airfoil assembly is at least partially positioned within the attachment assembly and extends outwardly from the attachment assembly. The airfoil assembly includes a ceramic matrix composite (CMC) substrate. A reaction barrier coating is disposed over at least a portion of the airfoil assembly. The reaction barrier coating is positioned between the attachment assembly and the airfoil assembly.

In another aspect, a method for fabricating a turbine airfoil component assembly for use in a turbine engine system is provided. The method includes forming an airfoil assembly that includes a ceramic matrix composite (CMC) substrate. A reaction barrier coating is disposed over at least a portion of the airfoil assembly. An attachment assembly is formed about at least a portion of the airfoil assembly such that the reaction barrier coating is positioned between the airfoil assembly and the attachment assembly. The attachment assembly includes a metal alloy substrate.

BRIEF DESCRIPTION OF THE DRAWINGS

FIG. 6 is a flow chart illustrating an exemplary method that may be used for fabricating a turbine airfoil component assembly for use in a turbine engine system shown in FIG. 1.

DETAILED DESCRIPTION OF THE INVENTION

The exemplary methods, articles, and systems described herein overcome at least some disadvantages of known rotor blade assemblies by providing a turbine airfoil component assembly that includes a CMC airfoil formed with a metal-alloy attachment assembly that reduces an overall blade weight which increases an operation efficiency over known turbine blade assemblies. In addition, the embodiments described herein include a reaction barrier coating that is positioned between a CMC airfoil assembly and the attachment assembly to facilitate reducing a reaction between the CMC airfoil and the metal attachment assembly during fabrication of the turbine airfoil component assembly which may cause formation of a brittle phase in the metal alloy. As such, the cost of assembling and maintaining a turbine engine system is reduced.

As used herein, the term "airfoil component" refers to any turbine engine component that includes an airfoil portion such as, but not limited to, a turbine bucket, a rotor blade, a nozzle, and/or a stator vane.

Figure 1:
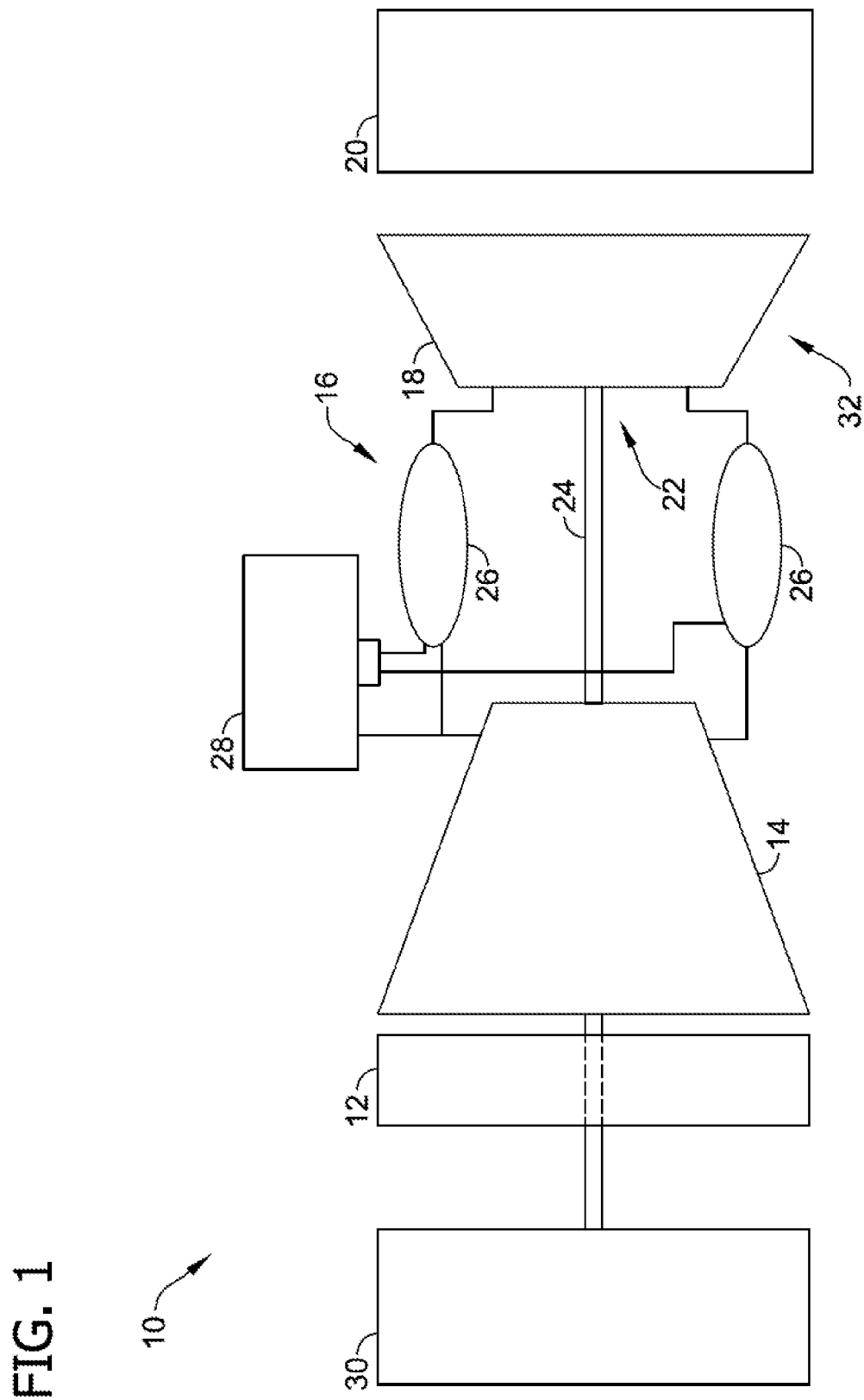
FIG. 1 is schematic illustration of an exemplary known turbine engine system.

FIG. 1 is a schematic view of an exemplary gas turbine engine system 10. In the exemplary embodiment, gas turbine engine system 10 includes an intake section 12, a compressor section 14 coupled downstream from intake section 12, a combustor section 16 coupled downstream from compressor section 14, a turbine section 18 coupled downstream from combustor section 16, and an exhaust section 20. Turbine section 18 includes a rotor assembly 22 coupled to compressor section 14 with a drive shaft 24. Combustor section 16 includes a plurality of combustors 26 and is coupled to compressor section 14 such that each combustor 26 is in flow communication with compressor section 14. A fuel assembly 28 is coupled to each combustor 26 to provide a flow of fuel to combustor 26. Turbine section 18 is rotatably coupled to compressor section 14 and to a load 30 such as, but not limited to, an electrical generator and a mechanical drive application. In the exemplary embodiment, compressor section 14 and turbine section 18 each include at least one rotor blade or turbine airfoil component assembly 32 that is coupled to rotor assembly 22.

During operation, intake section 12 channels air towards compressor section 14. Compressor section 14 compresses the inlet air to a higher pressure and temperature and discharges the compressed air towards combustor section 16. The compressed air is mixed with fuel and ignited to generate combustion gases that flow to turbine section 18. Turbine section 18 drives compressor section 14 and/or load 30. Moreover, at least a portion of the compressed air is supplied to fuel assembly 28. Fuel is channeled from fuel assembly 28 to each combustor 26 wherein it is mixed with the air and ignited in combustor section 16. Combustion gases are generated and channeled to turbine section 18 wherein the gases impinge upon turbine buckets 32 and stator vanes 34 (shown in FIG. 2) to facilitate imparting a rotational force on rotor assembly 22 wherein gas stream thermal energy is converted to mechanical rotational energy. Exhaust gases exit turbine section 18 and flow through exhaust section 20 to ambient atmosphere.

Figure 2:
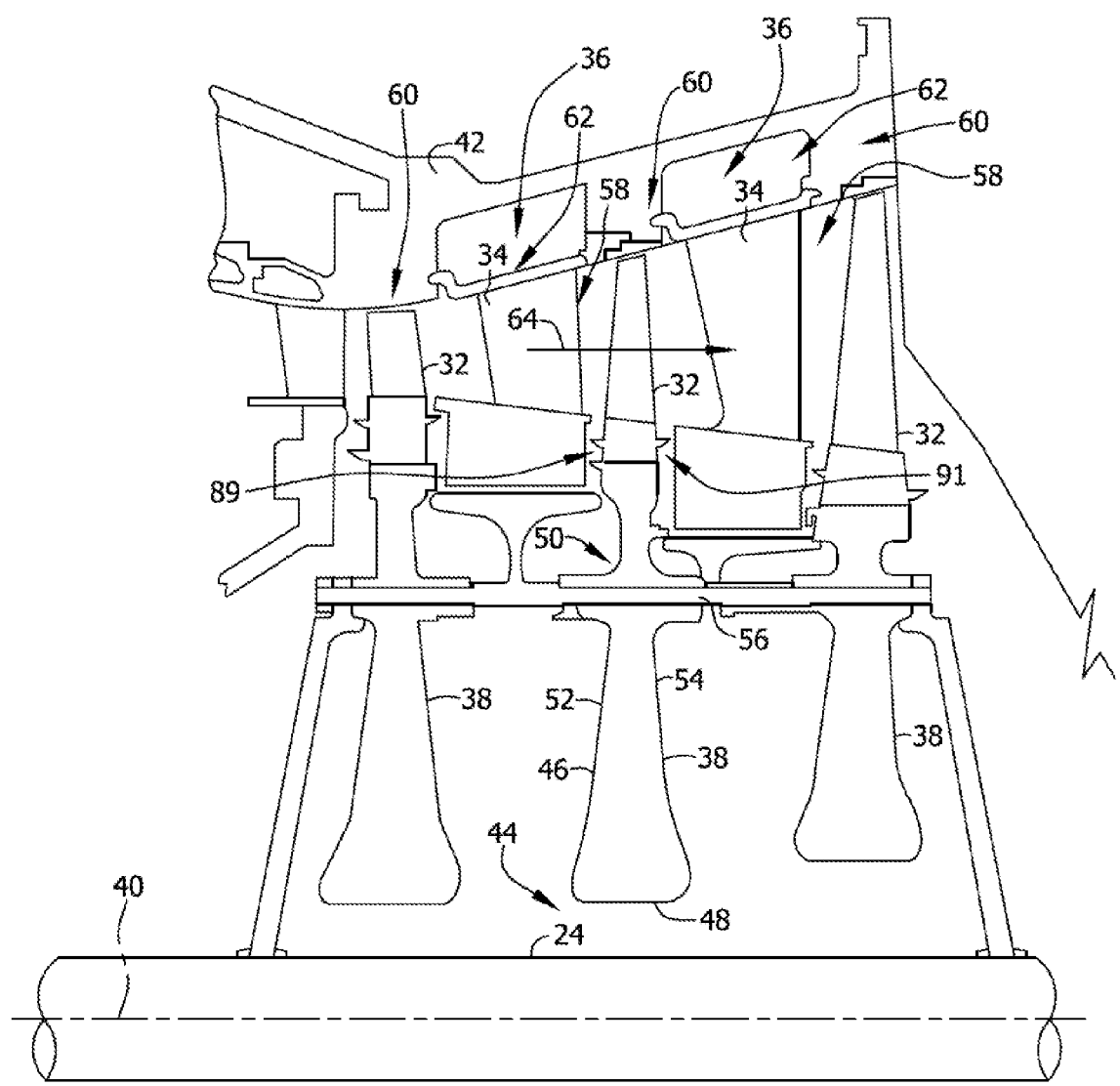
FIG. 2 is a partial sectional view of a portion of an exemplary rotor assembly that may be used with the turbine engine shown in FIG. 1.
Figure 3:
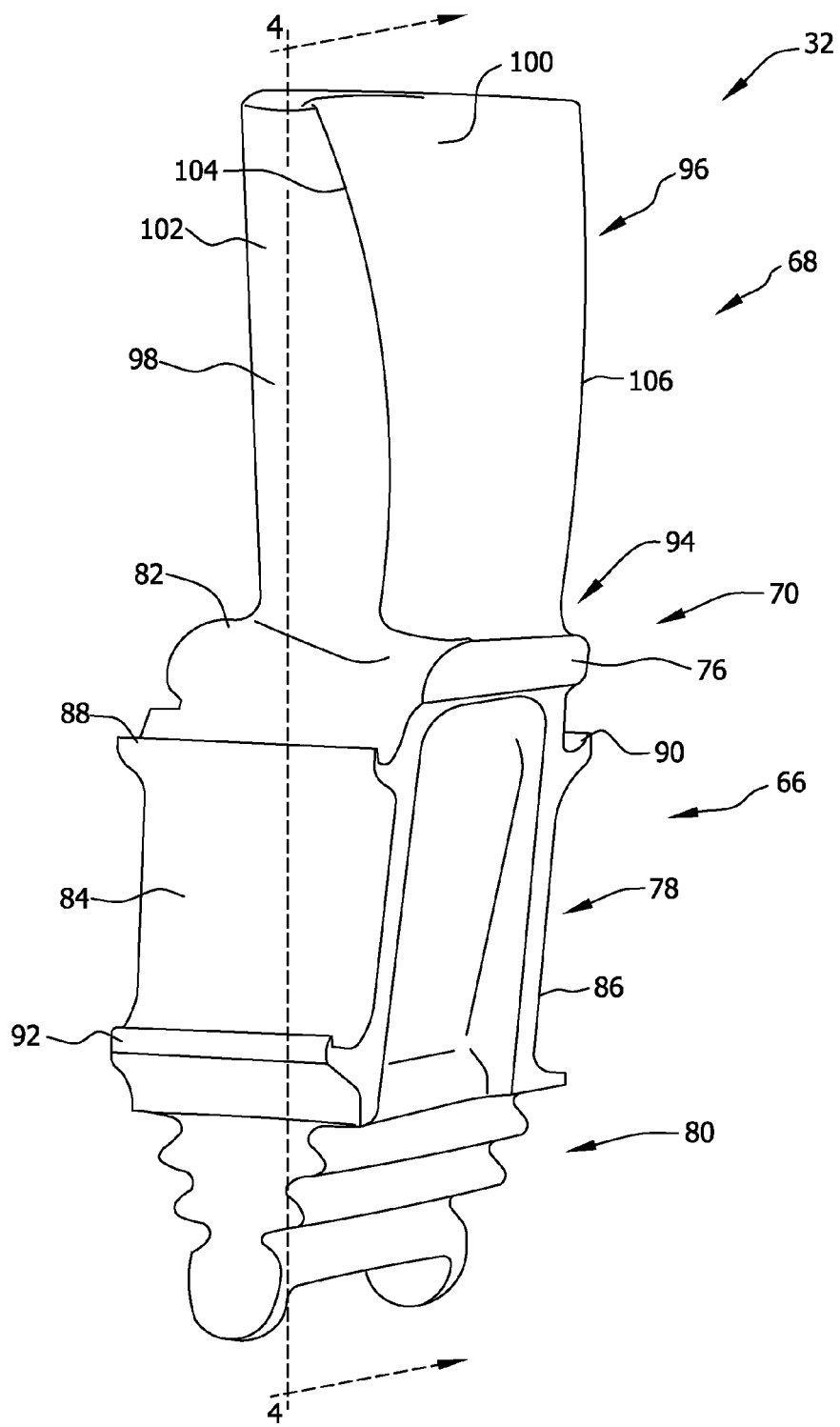
FIG. 3 is an enlarged perspective view of an exemplary turbine airfoil component assembly that may be used with the turbine engine system shown in FIG. 1.
Figure 4:
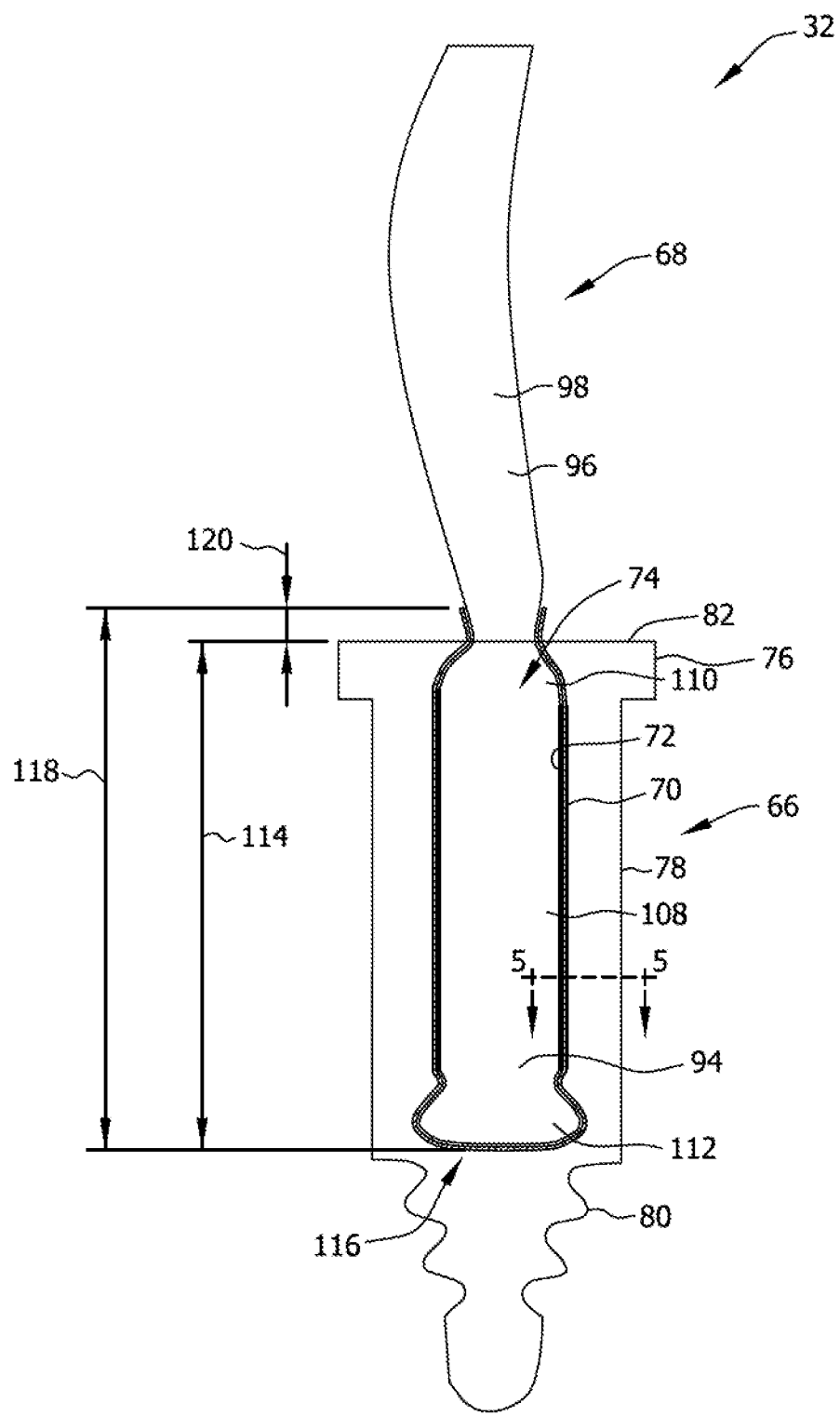
FIG. 4 is a cross-sectional view of the turbine airfoil component assembly shown in FIG. 3 and taken along line 4-4.

FIG. 2 is an enlarged perspective view of an exemplary embodiment of rotor assembly 22 that may be used with gas turbine engine system 10 (shown in FIG. 1). FIG. 3 is an enlarged perspective view of an exemplary embodiment of turbine airfoil component assembly 32 that may be used with the gas turbine engine system 10. FIG. 4 is a cross-sectional view of turbine airfoil component assembly 32 taken along sectional line 4-4 in FIG. 3. In the exemplary embodiment, turbine section 18 includes a plurality of stages 36 that each include a row of rotating turbine buckets 32 and a stationary row of stator vanes 34. Turbine buckets 32 each extend radially outward from a rotor disk 38. Each rotor disk 38 is coupled to drive shaft 24 and rotates about a centerline axis 40 defined by drive shaft 24. A turbine casing 42 extends circumferentially around rotor assembly 22 and stator vanes 34. Stator vanes 34 are each coupled to casing 42 and extend radially inward from casing 42 towards drive shaft 24.

In the exemplary embodiment, each rotor disk 38 is annular and includes a central bore 44 that extends substantially axially therethrough. More specifically, a disk body 46 extends radially outwardly from central bore 44 and is oriented substantially perpendicularly to centerline axis 40. Central bore 44 is sized to receive drive shaft 24 therethrough. Disk body 46 extends radially between a radially inner surface 48 and a radially outer surface 50, and extends axially from an upstream surface 52 to an opposite downstream surface 54. Upstream surface 52 and downstream surface 54 each extend between inner surface 48 and outer surface 50. A support arm 56 extends between adjacent rotor disks 38 to form rotor assembly 22.

Each airfoil component assembly 32 is coupled to disk outer surface 50 and is spaced circumferentially around rotor disk 38. Adjacent rotor disks 38 are oriented such that a gap 58 is defined between each row 60 of circumferentially-spaced turbine buckets 32. Gap 58 is sized to receive a row 62 of stator vanes 34 that are spaced circumferentially about drive shaft 24. Stator vanes 34 are oriented to channel combustion gases downstream towards airfoil component assembly 32. A combustion gas path 64 is defined between turbine casing 42 and each rotor disk 38. Each row 60 and 62 of turbine buckets 32 and stator vanes 34 extends at least partially through a portion of combustion gas path 64.

In the exemplary embodiment, a airfoil component assembly 32 includes a attachment assembly 66, an airfoil assembly 68 coupled to attachment assembly 66, and a reaction barrier coating 70 positioned between attachment assembly 66 and airfoil assembly 68. Attachment assembly 66 includes an inner surface 72 that defines a cavity 74 therein. Airfoil assembly 68 is at least partially positioned within cavity 74 to facilitate coupling airfoil assembly 68 to attachment assembly 66. In the exemplary embodiment, attachment assembly 66 includes a platform 76, a shank 78, and a dovetail 80. Platform 76 includes an outer surface 82 that at least partially defines combustion gas path 64. Shank 78 extends radially inwardly from platform 76 to dovetail 80. Dovetail 80 extends radially inwardly from shank 78 and enables airfoil component assembly 32 to securely couple to rotor disk 38. Alternatively, attachment assembly 66 includes a tip shroud (not shown).

In one embodiment, shank 78 includes a forward cover plate 84 and an opposite aft cover plate 86. A forward wing 88 extends outwardly from forward cover plate 84 to facilitate sealing a forward buffer cavity 89 (shown in FIG. 2) that is defined between rotor disk upstream surface 52 and stator vane 34. An aft wing 90 extends outwardly from aft cover plate 86 to facilitate sealing an aft buffer cavity 91 defined between rotor disk downstream surface 54 and stator vane 34. In an alternative embodiment, a forward lower wing 92 extends outwardly from forward cover plate 84 to facilitate sealing between airfoil component assembly 32 and rotor disk 38. Forward lower wing 92 is positioned between dovetail 80 and forward wing 88.

In the exemplary embodiment, airfoil assembly 68 includes a root portion 94 and an airfoil portion 96 that extends outwardly from root portion 94. Airfoil portion 96 includes an outer surface 98 that has an airfoil shape. Airfoil portion 96 includes a pressure side 100 and a suction side 102. Pressure side 100 and suction side 102 extend generally axially between a leading edge 104 and an opposite trailing edge 106. Pressure side 100 is generally concave and suction side 102 is generally convex. In the exemplary embodiment, root portion 94 includes an outer surface 108 extending between a first end 110 adjacent airfoil portion 96 and an opposite second end 112. Root portion 94 has a length 114 defined between first end 110 and second end 112. In the exemplary embodiment, root portion 94 is positioned within cavity 74 such that airfoil portion 96 extends outwardly from platform 76 towards turbine casing 42 (shown in FIG. 2). In one embodiment, root portion 94 is positioned within cavity 74 such that first end 110 is adjacent platform outer surface 82. In the exemplary embodiment, outer surface 108 of root portion 94 defines a dovetail shape at second end 112. Platform inner surface 72 defines a dovetail groove 116 sized and shaped to receive root portion 94 therein.

In the exemplary embodiment, reaction barrier coating 70 is disposed over at least a portion of airfoil assembly 68. Reaction barrier coating 70 is positioned between airfoil assembly 68 and attachment assembly 66 to facilitate minimizing and/or preventing a chemical reaction between airfoil assembly 68 and attachment assembly 66. In the exemplary embodiment, reaction barrier coating 70 is disposed over at least a portion of root portion 94 such that inner surface 72 of attachment assembly 66 does not contact outer surface 108 of root portion 94. Reaction barrier coating 70 is disposed substantially over root portion 94, and includes a length 118 extending from second end 112 to first end 110. In one embodiment, reaction barrier coating length 118 is approximately equal to root portion length 114. In an alternative embodiment, reaction barrier coating 70 is disposed over root portion 94 and over at least a portion of airfoil portion 96 such that length 118 of reaction barrier coating 70 is longer than root portion length 114, and extends a distance 120 outwardly from platform outer surface 82 towards airfoil portion 96.

Figure 5:
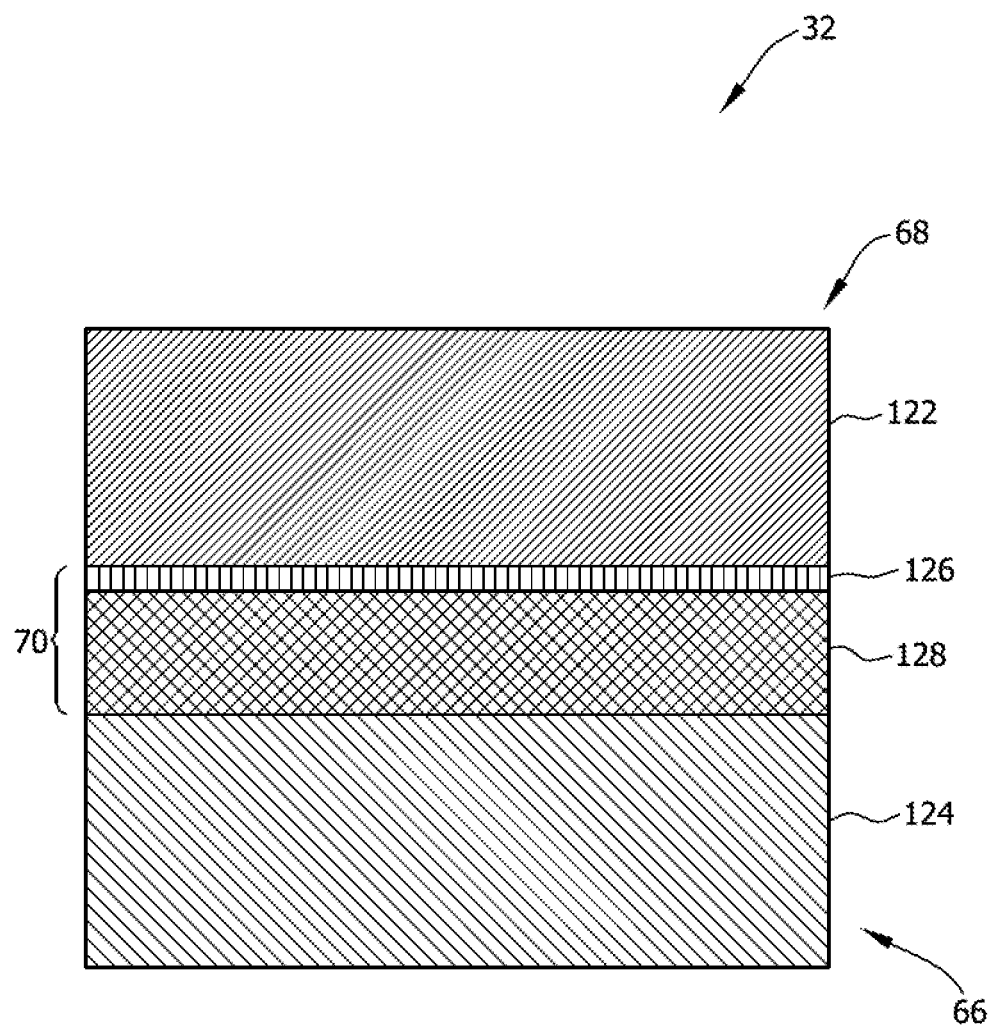
FIG. 5 is another cross-sectional view of the turbine airfoil component assembly shown in FIG. 4 and taken along line 5-5.

FIG. 5 is a cross-sectional view of turbine airfoil component assembly 32 taken along sectional line 5-5 in FIG. 4. Identical components shown in FIG. 5 are labeled with the same reference numbers used in FIG. 4. In the exemplary embodiment, airfoil assembly 68 includes a substrate material 122 formed from a ceramic material or ceramic matrix composite (CMC) material. The CMC material, in one embodiment, includes silicon carbide (SiC) in a SiC/SiC CMC material. During fabrication of SiC/SiC CMC material, silicon (Si) reacts with carbon (C) to form silicon carbide (SiC) and free silicon. The SiC/SiC CMC material includes a silicon carbide composite material infiltrated with silicon and reinforced with coated silicon carbide fibers. In an alternative embodiment, the ceramic material is a monolithic ceramic material, such as SiC. Alternatively, airfoil assembly 68 may be fabricated from any suitable silicon-based material that enables airfoil component assembly 32 to function as described herein.

In the exemplary embodiment, attachment assembly 66 includes a substrate material 124 formed from a metal alloy. In one embodiment, the metal alloy includes a nickel-based alloy, such as a so-called nickel-based superalloy, wherein the amount of nickel in the superalloy is the single greatest element by weight. Illustrative nickel-based superalloys include at least approximately 40% by weight nickel (Ni), and at least one component from the group consisting of cobalt (Co), chromium (Cr), aluminum (Al), tungsten (W), molybdenum (Mo), titanium (Ti), tantalum (Ta), Niobium (Nb), hafnium (Hf), boron (B), carbon (C), and iron (Fe). Examples of nickel-based superalloys may be designated by, but not be limited to the trade names Inconel®, Nimonic®, Rene® (e.g., Rene®80-, Rene®95, Rene®142, and Rene®N5 alloys), and Udimet®, and include directionally solidified and single crystal superalloys.

In the exemplary embodiment, reaction barrier coating 70 is applied to airfoil CMC substrate material 122 to prevent a transfer of free silicon from CMC substrate material 122 to metal alloy substrate material 124 of attachment assembly 66. In the exemplary embodiment, reaction barrier coating 70 includes at least one layer that includes a material selected from a group consisting of monosilicates, disilicates, rare earth (RE) monosilicates, RE disilicates, alumina, yttria, yttrium aluminate, zircon, zirconia, hafnium, hafnia, boron nitride, and titanium nitride. In one embodiment, the RE silicate comprises an element selected from a group consisting of the Lanthanides, Sc (scandium), and Y (yttrium). It will be noted that, for the purposes of this description, Sc and Y shall be included with the Lanthanides. In a particular embodiment, the RE silicate comprises Y, Yb (ytterbium), or Lu (lutetium).

In one embodiment, reaction barrier coating 70 includes a bondcoat 126 and at least one reaction barrier layer 128. Reaction barrier layer 128 is bonded to CMC substrate material 122 using bondcoat 126. As used herein, references to the term "bonded" refers to direct and/or indirect bonding through another layer, such as a bondcoat or an intermediate layer. In the exemplary embodiment, bondcoat 126 is disposed over at least a potion of CMC substrate material 122. Reaction barrier layer 128 is applied to or deposited over bondcoat 126 to facilitate bonding reaction barrier layer 128 to CMC substrate material 122. In the exemplary embodiment, bondcoat 126 includes silicon. In one embodiment, bondcoat 126 may include, for example, elemental silicon, silicides, or silicon carbide. In the exemplary embodiment, reaction barrier layer 128 includes a material selected from a group consisting of monosilicates, disilicates, rare earth (RE) monosilicates, RE disilicates, alumina, yttria, yttrium aluminate, zircon, zirconia, hafnium, hafnia, boron nitride, and titanium nitride.

In the exemplary embodiment, reaction barrier coating 70 has a combined thickness in the range from about 3.0 mils to about 10.0 mils. Alternatively, reaction barrier coating 70 may have a combined thickness of less than, or equal to, 3.0 mils. In an alternative embodiment, reaction barrier coating 70 may have a combined thickness that is equal to, or greater than, 10 mils.

In the exemplary embodiment, reaction barrier coating 70 is disposed on CMC substrate material 122 using a slurry dip process. Alternatively, reaction barrier coating 70 may be disposed on CMC substrate material 122 using a plasma spray process or an aerosol spray process. In an alternative embodiment, reaction barrier coating 70 may be applied to CMC substrate material 122 using a physical vapor deposition, a chemical vapor deposition process, sol gel technology, a slurry spray process, paint spray processes, and/or any suitable process known to those skilled in the art to enable reaction barrier coating 70 to function as described herein.

FIG. 6 is a flow chart illustrating an exemplary method 200 for manufacturing turbine airfoil component assembly 32. In the exemplary embodiment, method 200 includes forming 202 airfoil assembly 68 including airfoil portion 96 and root portion 94. Each airfoil portion 96 and root portion 94 include CMC substrate material 122. Reaction barrier coating 70 is deposited 204 over at least a portion of the airfoil assembly 68. In one embodiment, a bondcoat 126 is deposited over at least a portion of root portion 94, and reaction barrier layer 128 is deposited over bondcoat 126 to form reaction barrier coating 70. In the exemplary embodiment, reaction barrier coating 70 is deposited 204 using a slurry dip process. Alternatively, reaction barrier coating 70 is deposited 204 using a plasma spray process or an aerosol spray process. In the exemplary embodiment, method 200 also includes sintering 206 reaction barrier coating 70. In one embodiment, sintering 206 includes heating airfoil assembly 68 and reaction barrier coating 70 to a predefined temperature for a predefined period of time to obtain a desired porosity and hardness. Alternatively, sintering 206 may include hot isostatic pressing. In the exemplary embodiment, attachment assembly 66 is formed 208 about at least a portion of sintered airfoil assembly 68 such that reaction barrier coating 70 is positioned between airfoil assembly 68 and attachment assembly 66. Attachment assembly 66 is formed from a metal alloy.

In one embodiment, attachment assembly 66 is formed using investment casting. In such an embodiment, during fabrication of attachment assembly 66, a stalk of CMC substrate material 122 that is coated with reaction barrier coating 70 is suspended in a platform assembly die. Hot wax is injected into the platform assembly die to surround the CMC stalk at root portion 94. The hot wax solidifies and forms 210 a wax platform with the CMC stalk suspended in the wax platform. The wax platform with the CMC stalk is repeatedly dipped into a ceramic slurry to form 212 a ceramic shell outside the wax platform. The CMC stalk, wax, and shell cluster is then heated to an elevated temperature to remove 214 the wax and form a casting mold with the CMC stalk in the middle. The molten nickel-based alloy is then poured 216 into the hollow casting mold. The molten nickel-based alloy replaces the wax platform, and forms a metal attachment assembly 66 with the CMC root portion 94 remaining in place. In one embodiment, reaction barrier coating 70 is sintered prior to investment casting. Alternatively, reaction barrier coating 70 may be sintered during the investment casting process, such as, for example prior to adding the molten nickel-based alloy. The attachment assembly 66 is then cooled and machined to predefined dimensions. During the investment casting process, reaction barrier coating 70 facilitates preventing a transfer of free silicon from CMC substrate material 122 to the nickel-based alloy. In one embodiment, centrifugal and/or hydrostatic pressure may be used to reduce the temperature and required period of time for the investment casting process to facilitate minimizing a chemical reaction between the CMC substrate material 122 and the nickel-based alloy. In an alternative embodiment, attachment assembly 66 is formed using a solid-state reaction process that includes bonding two or more sections of attachment assembly 66 around the CMC stalk.

The above-described methods and apparatus facilitate fabricating a turbine airfoil component assembly having a reduced weight and increased thermal performance over known rotor blades. More specifically, the embodiments described herein include a CMC airfoil formed with a metal-alloy attachment assembly. In addition, the turbine bucket includes a reaction barrier coating that is disposed between a CMC airfoil assembly and the attachment assembly to facilitate reducing a reaction between the CMC airfoil and the metal attachment assembly during fabrication of the turbine airfoil component assembly which may cause the formation of a brittle phase of the metal alloy. As such, the cost of assembling and maintaining a turbine engine system is facilitated to be reduced.

Exemplary embodiments of methods and apparatus for a turbine airfoil component assembly are described above in detail. The methods and apparatus are not limited to the specific embodiments described herein, but rather, components of systems and/or steps of the method may be utilized independently and separately from other components and/or steps described herein. For example, the methods and apparatus may also be used in combination with other combustion systems and methods, and are not limited to practice with only the gas turbine engine assembly as described herein. Rather, the exemplary embodiment can be implemented and utilized in connection with many other combustion system applications.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine airfoil component assembly for use with a turbine engine, said turbine airfoil component assembly comprising:
    an attachment assembly having an inner surface that defines a cavity, said attachment assembly comprising a metal alloy substrate;
    an airfoil assembly at least partially positioned within said attachment assembly and extending outwardly from said attachment assembly, said airfoil assembly comprising a ceramic matrix composite (CMC) substrate; and
    a reaction barrier coating disposed over at least a portion of said airfoil assembly, said reaction barrier coating positioned between said attachment assembly and said airfoil assembly, said reaction barrier coating having a thickness in a range from about 3.0 mils to about 10.0 mils.

2. The turbine airfoil component assembly in accordance with claim 1, wherein said reaction barrier coating comprises a material selected from a group consisting of monosilicates, disilicates, rare earth (RE) monosilicates, RE disilicates, alumina, yttria, yttrium aluminate, zircon, zirconia, hafnium, hafnia, boron nitride, and titanium nitride.

3. The turbine airfoil component assembly in accordance with claim 1, wherein said reaction barrier coating comprises a bondcoat and a reaction barrier layer.

4. The turbine airfoil component assembly in accordance with claim 3, wherein said bondcoat comprises silicon.

5. The turbine airfoil component assembly in accordance with claim 1, wherein said CMC substrate comprises a silicon carbide (SiC) matrix.

6. The turbine airfoil component assembly in accordance with claim 1, wherein said attachment assembly comprises a nickel-based alloy substrate.

7. The turbine airfoil component assembly in accordance with claim 6, wherein said CMC substrate comprises a silicon-based material, said reaction barrier coating is configured to prevent a transfer of a free silicon from said CMC substrate to said nickel-based alloy substrate.

8. The turbine airfoil component assembly in accordance with claim 1, wherein said reaction barrier coating comprises a reaction barrier layer disposed over a bondcoat, said bondcoat comprising silicon, said reaction barrier layer comprising a material selected from a group consisting of monosilicates, disilicates, RE monosilicates, RE disilicates, alumina, yttria, yttrium aluminate, zircon, zirconia, hafnium, hafnia, boron nitride, and titanium nitride.

9. A turbine engine system comprising:
    a compressor;
    a turbine coupled in flow communication with said compressor to receive at least some of the air discharged by said compressor;
    a rotor shaft rotatably coupled to said turbine; and
    a plurality of circumferentially-spaced turbine airfoil component assembly coupled to said rotor shaft, each of said plurality of turbine airfoil component assemblies comprising:
        an attachment assembly having an inner surface that defines a cavity, said attachment assembly comprising a metal alloy substrate;
        an airfoil assembly at least partially positioned within said attachment assembly and extending outwardly from said attachment assembly, said airfoil assembly comprising a ceramic matrix composite (CMC) substrate; and
        a reaction barrier coating disposed over at least a portion of said airfoil assembly, said reaction barrier coating positioned between said attachment assembly and said airfoil assembly, said reaction barrier coating having a thickness in a range from about 3.0 mils to about 10.0 mils.

10. The turbine engine system in accordance with claim 9, wherein said reaction barrier coating comprises a material selected from a group consisting of monosilicates, disilicates, RE monosilicates, RE disilicates, alumina, yttria, yttrium aluminate, zircon, zirconia, hafnium, hafnia, boron nitride, and titanium nitride.

11. The turbine engine system in accordance with claim 9, wherein said reaction barrier coating comprises a bondcoat and a reaction barrier layer.

12. The turbine engine system in accordance with claim 11, wherein said bondcoat comprises silicon.

13. The turbine engine system in accordance with claim 9, wherein said CMC substrate comprises a silicon carbide (SiC) matrix.

14. The turbine engine system in accordance with claim 9, wherein said attachment assembly comprises a nickel-based alloy substrate.

15. The turbine engine system in accordance with claim 14, wherein said CMC substrate comprises a silicon-based material, said reaction barrier coating is configured to prevent a transfer of a free silicon from said CMC substrate to said nickel-based alloy substrate.

16. The turbine engine system in accordance with claim 9, wherein said reaction barrier coating comprises a reaction barrier layer disposed over a bondcoat, said bondcoat comprising silicon, said reaction barrier layer comprising a material selected from a group consisting of monosilicates, disilicates, RE monosilicates, RE disilicates, alumina, yttria, yttrium aluminate, zircon, zirconia, hafnium, hafnia, boron nitride, and titanium nitride.

17. A method for fabricating a turbine airfoil component assembly for use in a turbine engine system, said method comprising:
   forming an airfoil assembly including a ceramic matrix composite (CMC) substrate;
   depositing a reaction barrier coating over at least a portion of the airfoil assembly, the reaction barrier coating having a thickness in a range from about 3.0 mils to about 10.0 mils; and
   forming an attachment assembly about at least a portion of the airfoil assembly such that the reaction barrier coating is positioned between the airfoil assembly and the attachment assembly, the attachment assembly including a metal alloy substrate.

18. The method in accordance with claim 17, wherein said forming an attachment assembly comprises forming the attachment assembly by investment casting.

19. The method in accordance with claim 17, wherein said depositing a reaction barrier coating over at least a portion of the airfoil assembly comprises:
   depositing a bondcoat over at least a portion of the airfoil assembly; and
   depositing a reaction barrier layer over the bondcoat.

20. The method in accordance with claim 17, further comprising depositing the reaction barrier coating using one of a slurry dip, plasma spray, and aerosol spray.

* * * * *